US008547826B2

(12) United States Patent
Nomura et al.

(10) Patent No.: US 8,547,826 B2
(45) Date of Patent: Oct. 1, 2013

(54) MONITORING APPARATUS AND MONITORING METHOD

(75) Inventors: Yuji Nomura, Kawasaki (JP); Takeshi Yasuie, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 310 days.

(21) Appl. No.: 12/874,613

(22) Filed: Sep. 2, 2010

(65) Prior Publication Data

US 2011/0058482 A1    Mar. 10, 2011

(30) Foreign Application Priority Data

Sep. 4, 2009   (JP) .................................. 2009-205366

(51) Int. Cl.
*H04L 1/00* (2006.01)
(52) U.S. Cl.
USPC ...................................... 370/216; 370/395.54
(58) Field of Classification Search
None
See application file for complete search history.

(56) References Cited

U.S. PATENT DOCUMENTS

| | | | | |
|---|---|---|---|---|
| 5,724,510 | A * | 3/1998 | Arndt et al. ................... | 709/220 |
| 7,200,649 | B1 * | 4/2007 | Batke et al. ................... | 709/222 |
| 7,440,424 | B2 * | 10/2008 | Nam et al. .................... | 370/310 |
| 2001/0017857 | A1 * | 8/2001 | Matsukawa ................... | 370/392 |
| 2004/0174904 | A1 * | 9/2004 | Kim et al. ..................... | 370/475 |
| 2004/0258007 | A1 * | 12/2004 | Nam et al. .................... | 370/310 |
| 2008/0144523 | A1 * | 6/2008 | Nishi et al. ................... | 370/253 |
| 2010/0122335 | A1 * | 5/2010 | Van der Merwe et al. ...... | 726/11 |
| 2012/0166629 | A1 * | 6/2012 | Imamura ....................... | 709/224 |

FOREIGN PATENT DOCUMENTS

| | | | |
|---|---|---|---|
| EP | 1489817 A1 | * | 12/2004 |
| JP | 03-212038 | | 9/1991 |
| JP | 07-038597 | | 2/1995 |
| JP | 09-321757 | | 12/1997 |
| JP | 2009164848 A | | 7/2009 |

OTHER PUBLICATIONS

Office Action of Japanese Patent Application No. 2009-205366 dated Jun. 25, 2013 with Partial Translation.
Kazuki Akima, et al.; "A Study on Duplicate Address Detection for Mobile Ad hoc Networks", IEICE Technical Report, The Institute of Electronics, Information and Communication Engineers, Japan, vol. 107, No. 29, AN2007-5, pp. 23-28, May 2, 2007.

* cited by examiner

*Primary Examiner* — Hassan Kizou
*Assistant Examiner* — Roberta A Shand
(74) *Attorney, Agent, or Firm* — Katten Muchin Rosenman LLP

(57) ABSTRACT

A monitoring apparatus for monitoring packet communication by a plurality of information processing apparatuses. The monitoring apparatus includes a receiving unit for receiving packets transmitted from the plurality of information processing apparatuses, a storage unit for storing a first identification value of a first packet and a first transmission source address of the first packet, and a processing unit for comparing a second identification value of a second packet with the first identification value of the first packet when a second transmission source address of the second packet matches the first transmission source address of the first packet to detect duplication of IP addresses when a difference between the first identification value and the second identification value exceeds a predetermined value.

20 Claims, 12 Drawing Sheets

| TRANSMISSION SOURCE ADDRESS (901) | OS TYPE (902) |
|---|---|
| A | 1 |
| B | 2 |
| C | 1 |
| ... | |

FIG. 12

| 1201 | 1202 | 1203 | 1204 | 1205 | 1206 | 1207 | 1208 | 1209 | 1210 |
|---|---|---|---|---|---|---|---|---|---|
| CID | PREVIOUS TRANSMISSION SOURCE | IA | PREVIOUS IA ID | RETRANSMISSION IMMEDIATELY BEFORE IA | PREVIOUS IA RECEPTION TIME | SA | PREVIOUS SA ID | RETRANSMISSION IMMEDIATELY BEFORE SA | PREVIOUS RECEPTION TIME |
| AAA | B | A | 101 | 0 | 14:10:05.491392 | B | 8857 | 2 | 14:10:05.192837 |
| BBB |  |  | 9876 |  | 14:10:05.115728 |  |  |  | 14:10:05.099828 |
| CCC |  |  | 3456 |  | 14:10:05.325289 |  |  |  | 14:10:05.467823 |
| ... |  |  | ... |  |  |  |  |  | ... |

1200

MONITORING APPARATUS AND MONITORING METHOD

CROSS-REFERENCE TO RELATED APPLICATION

This application is based upon and claims the benefit of priority of the prior Japanese Patent Application No. 2009-205366, filed on Sep. 4, 2009, the entire contents of which are incorporated herein by reference.

FIELD

The embodiments discussed herein are related to a technology for detecting duplication of IP addresses in a network.

BACKGROUND

There are cases in which a failure occurs owing to there being duplicate IP addresses in the same subnet. That is, in the same subnet, if the same IP address is assigned to different host computers, there is a possibility that a failure will occur, which is problematic.

In the same subnet, if the same IP address is assigned to different hosts, more specifically, a problem will occur in cases such as those described below. In a case where a device outside a subnet transmits a packet in which a duplicate IP address is used as a transmission destination, a router of the subnet refers to an address resolution protocol (ARP) table and transfers the packet. However, there is only one pair of an IP address and a MAC address, which are written in the ARP table. For this reason, even in a case where an IP address is assigned in a duplicated manner to different hosts, the packet is transferred to only the host computer having a MAC address written in the ARP table, and the packet is not transferred to the other host computers.

The ARP table in the router is updated moment by moment in accordance with the communication situation, such as being updated when a packet is transmitted finally in the router. For this reason, if an IP address has been assigned to different host computers in a duplicated manner, the packet arrives at only wrong host computers, with the result that the communication is disconnected or an interruption occurs.

Therefore, a technology for detecting duplication of IP addresses in the same subnet is an important technology in managing and supporting a network system. Typical methods for detecting such a duplication of IP addresses are the following. In one method, ARP request packets are transmitted by broadcasting by using an IP address in a subnet as a destination, and a response to the ARP request packet is checked. When the IP address has been duplicated, an ARP response is returned from a plurality of host computers. Consequently, it is possible to find the duplications of the IP address.

However, in the method, an ARP request packet needs to be transmitted to all the IP addresses in the subnet for which it is desired to find duplication of IP addresses. Therefore, the method has a problem in that scaling is not easy and the cost is high.

The following documents are examples of disclosing techniques for detecting duplication of IP addresses.
  Japanese Laid-Open Patent Publication No. 09-321757.
  Japanese Laid-Open Patent Publication No. 07-038597.
  Japanese Laid-Open Patent Publication No. 03-212038.

SUMMARY

According to an aspect of the embodiment, a monitoring apparatus for monitoring packet communication by a plurality of information processing apparatuses, includes a receiving unit for receiving packets transmitted from the plurality of information processing apparatuses, a storage unit for storing a first identification value of a first packet and a first transmission source address of the first packet, and a processing unit for comparing a second identification value of a second packet with the first identification value of the first packet when a second transmission source address of the second packet matches the first transmission source address of the first packet to detect duplication of an IP address when a difference between the first and second identification values exceeds a predetermined value.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 illustrates an OS type table 900 in the communication state storage unit 206 according to the present embodiment;

FIG. 12 illustrates a table 1200 in the communication state storage unit 206 according to the present embodiment.

DESCRIPTION OF EMBODIMENTS

Preferred embodiments will be explained with reference to accompanying drawings. A monitoring apparatus in the present embodiment detects, on the basis of a change in an ID value between packets flowing through a network, that a plurality of information processing apparatuses to which the same IP address has been assigned exist in the same subnet (duplication of an IP address). That is, the monitoring apparatus in the present embodiment identifies that the cause of a communication failure among information processing apparatuses is duplication of an IP address. Hereinafter, specific examples will be described.

1. Overview of Monitoring Sequence 100

Figure 1:
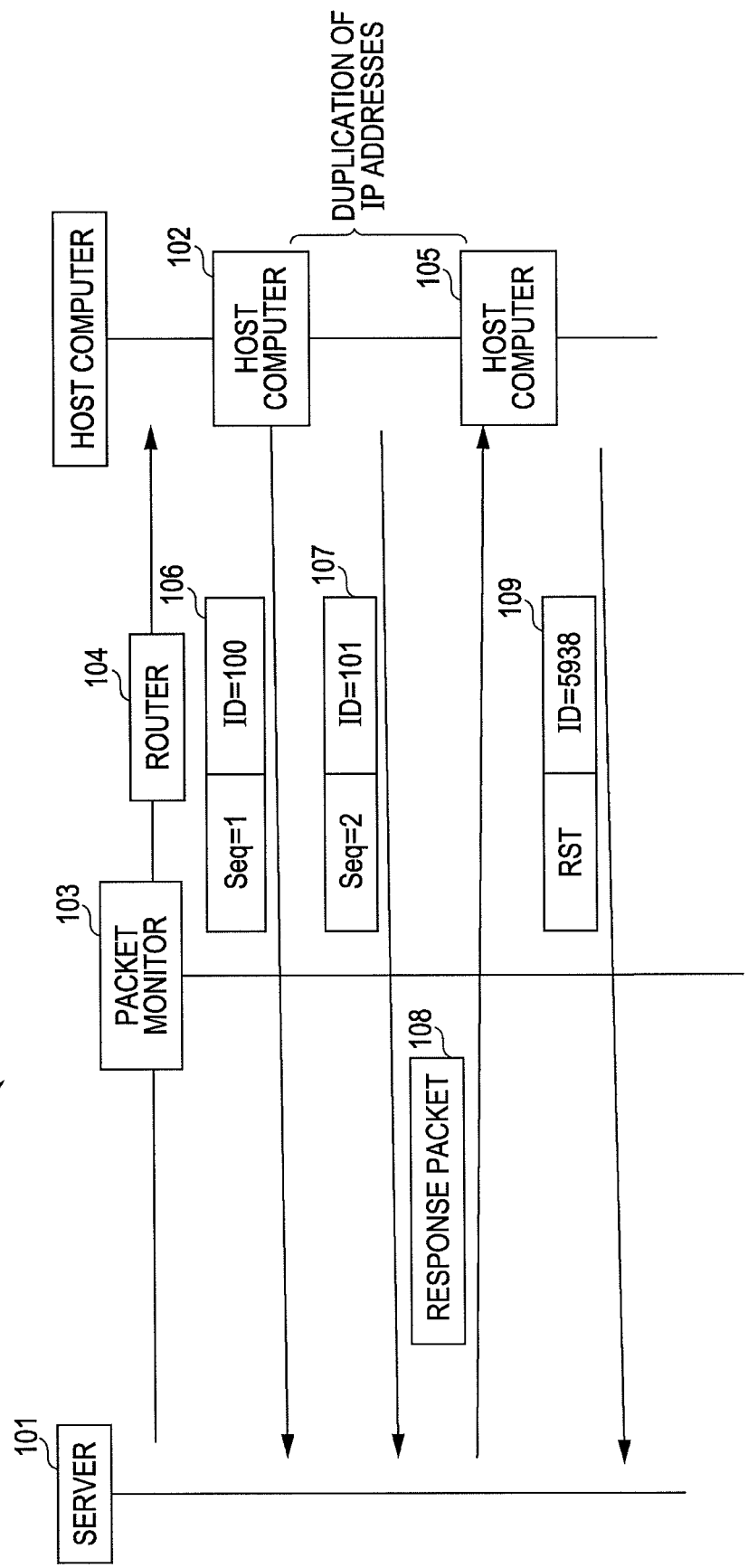
FIG. 1 is a conceptual view of a monitoring sequence 100 according to the present embodiment.

FIG. 1 is a conceptual view of a monitoring sequence 100 according to the present embodiment. A description will be given below, with reference to FIG. 1, of the operations of a packet monitor 103 in the monitoring sequence 100. The packet monitor 103 monitors communication between a server 101 and host computers 102 and 105 under management of a router 104. The same IP address is assigned to the host computer 102 and the host computer 105. That is, an IP address is duplicated for both the host computer 102 and the host computer 105.

In the monitoring sequence 100 of FIG. 1, first, the host computer 102 transmits request packets 106 and 107 to the server 101 via the router 104. The ID value of the request packet 106 is, for example, "100". When viewed chronologically, the ID value of the request packet transmitted by the host computer 107 after that is "101". This ID value is the value of the identification field of the Internet protocol (IP) header, and is a 16-bit value. The ID value is a value that is incremented each time one of the host computers 102 and 105 transmits a packet. Therefore, the ID values of packets that are transmitted by the same host computer 102 (or the host computer 105) have a property of monotonically increasing. Then, the server 101 sends back a response packet 108 for the request packets 106 and 107.

In the monitoring sequence 100 of FIG. 1, the server 101 transmits the response packet 108 to the host computer 105, which is different from the host computer 102. Primarily speaking, the response packet 108 is data to be transmitted to the host computer 102. When the host computer 105 receives the response data 108, since the response data is packets for an unknown connection that has not been established as a transmission control protocol (TCP) connection by the host computer 105, the host computer 105 transmits a TCP packet whose RST (Reset) flag is ON to the server 101. This is for the purpose of suppressing occurrences of the host computer 105 receiving a packet from the server 101 in the same TCP connection through which the response packet 108 has been received.

In this case, the ID value of an RST packet 109 that is transmitted by the host computer 105 greatly differs from the ID values of the request packets 106 and 107 that are transmitted by the host computer 102. The term "RST packet 109" refers to a packet in which the RST flag is ON. In the present embodiment, the ID value of the RST packet 109 is "5938". When compared to the ID value "100" of the request packet 106 and the ID value "101" of the request packet 107, the ID value "5938" of the RST packet 109 greatly differs. If the same IP address has not been assigned to a plurality of host computers in the same subnet, the ID value of the RST packet 109 can be expected to be "102".

That is, when an IP address has been duplicated in the same subnet, the ID values of packets that flow through the same TCP connection do not monotonically increase and are discontinuous. Furthermore, when the ID value of packets that flow through the same TCP connection decrease, the packet monitor 103 determines that an IP address has been duplicated in the same subnet. The packet monitor 103 in the present embodiment detects discontinuities and decreases in the ID values so as to detect duplication of IP addresses in the same subnet.

By disposing one packet monitor 103 in the present embodiment, it is possible to detect a plurality of information processing apparatuses to which the same IP address in a plurality of subnets has been assigned. Furthermore, it is not necessary to dispose an apparatus for detecting duplication of IP addresses for each subnet. Furthermore, it is not necessary for the monitoring apparatus to periodically transmit a packet to the host computer in the subnet in order to detect duplication of IP addresses. Consequently, it is possible to detect duplication of IP addresses and communication failures resulting from duplication of IP addresses at a low cost.

There are various causes of communication failure. If incorrect correction is made without accurately identifying the cause, large costs in terms of time and in human resources are incurred to recover from the failure. Therefore, as an advantage from the viewpoint of operational management, identifying that communication failure has resulted from duplication of IP addresses is important.

2. Packet Monitor 103

Figure 2:
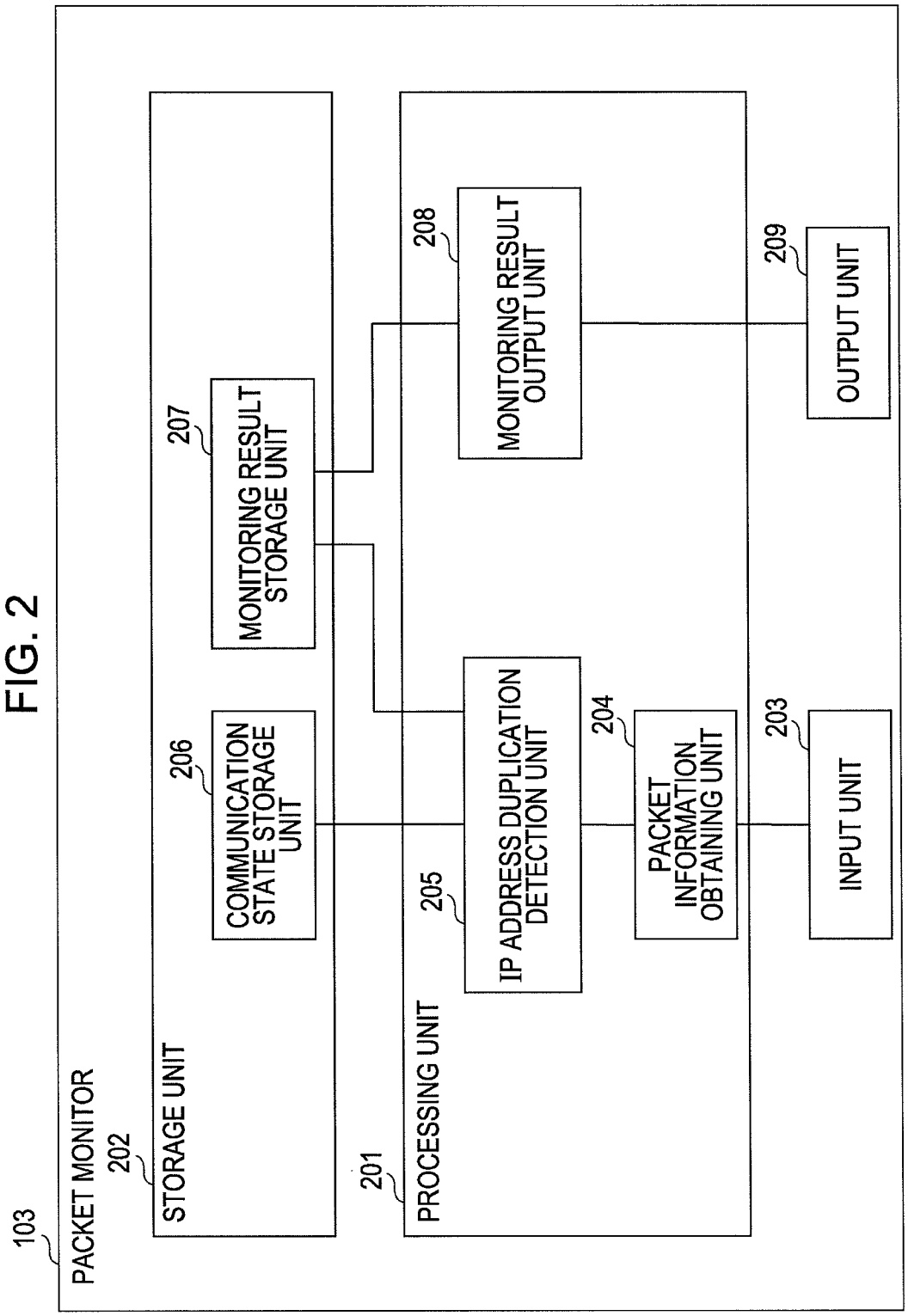
FIG. 2 is a block diagram of a packet monitor 103 according to the present embodiment.

FIG. 2 is a block diagram of the packet monitor 103 according to the present embodiment. The packet monitor 103 includes a processing unit 201, a storage unit 202, an input unit 203, and an output unit 209.

The processing unit 201 includes a packet information obtaining unit 204, an IP address duplication detection unit 205, and a monitoring result output unit 208. The packet information obtaining unit 204, the IP address duplication detection unit 205, and the monitoring result output unit 208 illustrated in FIG. 2 are function blocks, and are implemented functionally by the processing unit 201. Of course, the information obtaining unit 204, the IP address duplication detection unit 205, and the monitoring result output unit 208 may be of a physically different configuration.

The storage unit 202 includes the communication state storage unit 206 and the monitoring result storage unit 207. The communication state storage unit 206 and the monitoring result storage unit 207 are function blocks in which a storage area in the storage unit 202 is distinguished. Of course, in the storage unit 202, also, the communication state storage unit 206 and the monitoring result storage unit 207 may be of a physically different configuration.

By using the input unit 203, the packet monitor 103 monitors packets that are transmitted and received in the network interface.

The input unit 203, which is a network interface, is a unit to which packets are input and is a receiving unit that receives the packets. The packet monitor 103 monitors packets input from the input unit 203. Alternatively, file information in which captured packets and packet reception time information are stored together is input to the input unit 203. When the input unit 203 is a network interface, the input unit 203 constantly performs monitoring, for example, for lost packets. This case is excellent in real time handling or continuity of monitoring. Furthermore, when the input unit 203 receives file information that has been packet-captured, packet-captured data is obtained in advance and stored. In this case, it is possible to perform inspection for identifying whether the packet has been lost or delayed without disposing the packet monitor 103 on site.

The packet information obtaining unit 204 obtains the connection ID (CID) of the TCP described in the IP header of the packet, the Seq value of the IP header, the ID value, and the flag information of the TCP header. Here, the CID is a set of the transmission source address (SA: Source Address), the transmission source port number (SP: Source Port), the destination address (DA: Destination Address), and the destination port (DP: Destination Port). Since the CID is a combination of SA, SP, DA, and DP in the TCP/IP protocol, the CID is the same also when the transmission source and the destination are interchanged with each other. The reason for this is that TCP/IP communication is two-way communication, and packet transmission and reception between the server 101 and the host computers 102 and 103 are not discriminated between.

The packet information obtaining unit 204 obtains the CID, the Seq value, the ID value, and the flag information. There-after, the IP address duplication detection unit 205 searches the communication state storage unit 206 for information on a packet having the same CID. The IP address duplication detection unit 205 compares the ID value of the packet having the same CID as the CID of the search target with the ID value obtained by the packet information obtaining unit 204. Here, the ID value of the packet having the same CID as the CID of the search target is an ID value of a packet that is transmitted and received between the server 101 and the host computer 102 (or the host computer 103) immediately before the packet input to the input unit 203. In other words, the packet monitor 103 compares the ID value of the packet having the same CID in the IP address duplication detection unit 205 with the ID value of the packet, which is immediately before chronologically.

When the RST flag is ON in the flag information of the packet obtained by the packet information obtaining unit 204 and when the ID value compared by the IP address duplication detection unit 205 differs by, for example, 1000 or more, it is determined that the same IP address has been assigned to a plurality of host computers which have different MAC addresses, respectively, in the same subnet.

Figure 5:
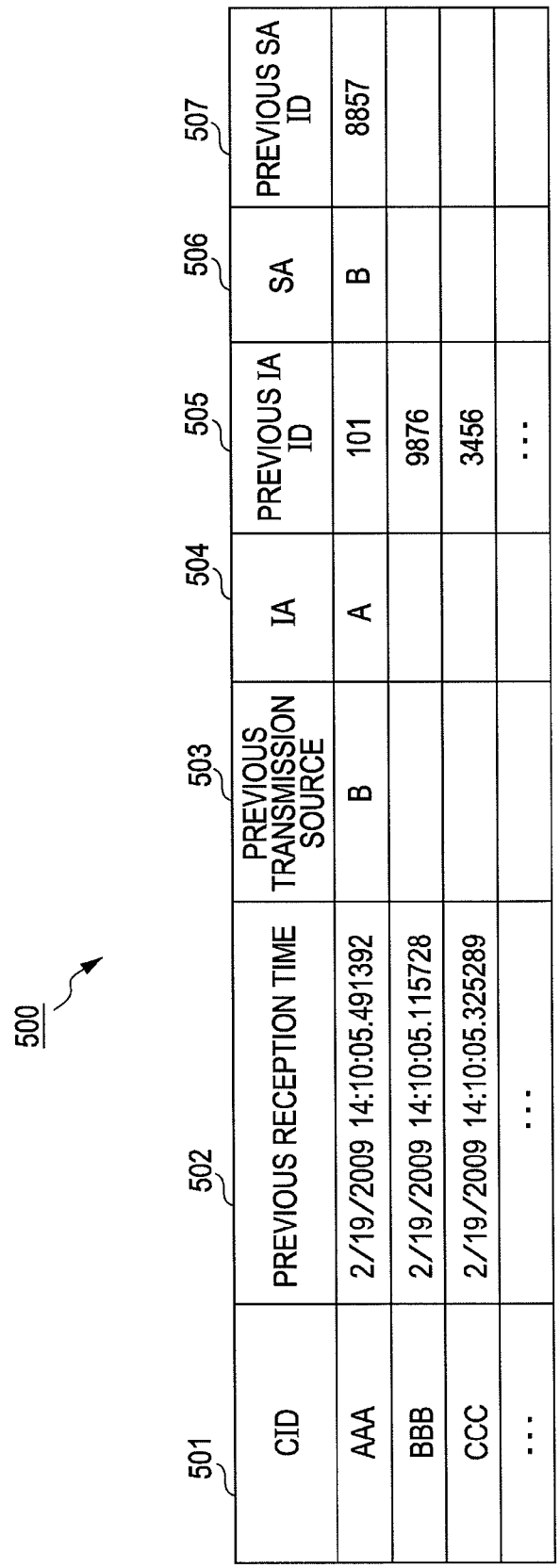
FIG. 5 illustrates a table 500 inside a communication state storage unit 206 according to the present embodiment.

The communication state storage unit 206 is a storage area in which a table 500 illustrated in FIG. 5 is stored. The table 500 is a table in which CIDs and ID values are associated with each other. The table 500 is composed of "CID 501", "previous reception time 502", "previous transmission source 503", "IA (Initiator Address) 504", "previous IA ID 505", "SA (Source Address) 506", and "previous SA ID 507". The IA 504 is an address on the side that transmitted an SYN packet. The SA 506 is an address on the side that received an SYN packet. Furthermore, the IP address duplication detection unit 205 has a function of searching the table 500 by using the CID 501 as a search condition, and reading the stored ID value 505 and reception time 502. Furthermore, the IP address duplication detection unit 205 has a function of searching the table 500 by using the CID 501 as a search condition, and updating the ID value 505 corresponding to the relevant CID 501. The communication state storage unit 206 is accessed by using the function by the IP address duplication detection unit 205.

Figure 6:
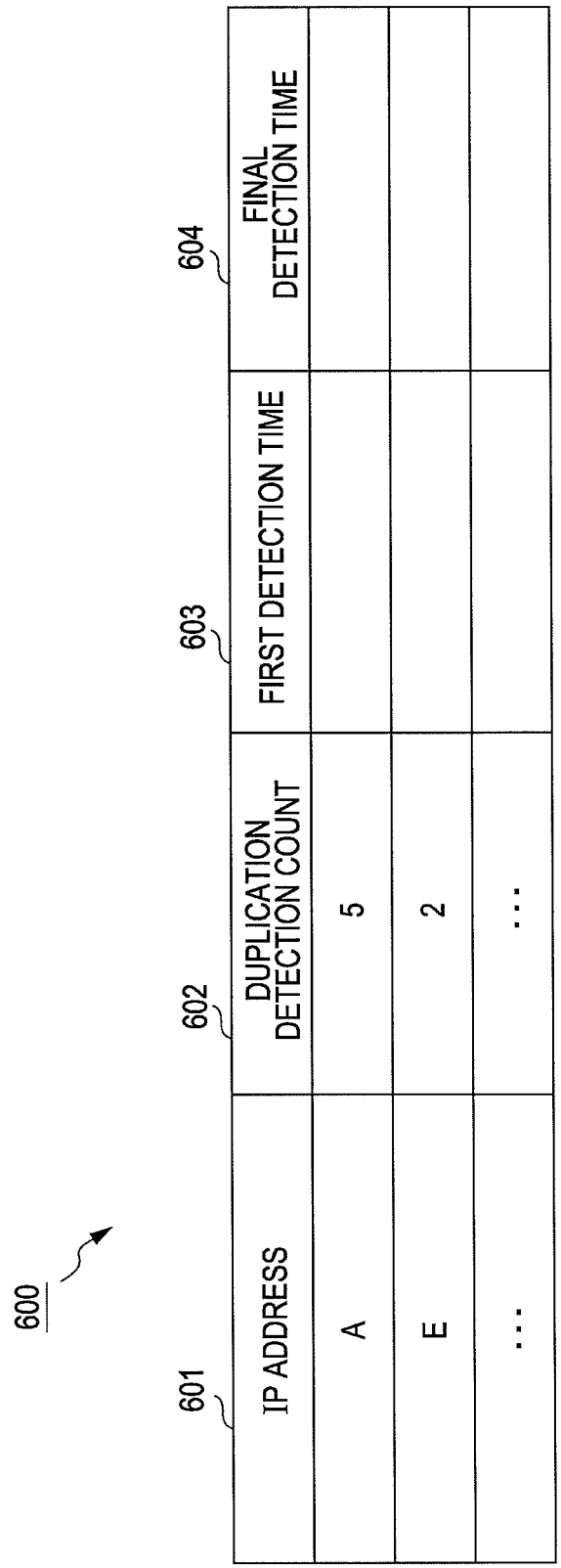
FIG. 6 illustrates a table 600 inside a monitoring result storage unit 207 according to the present embodiment.

The monitoring result storage unit 207 is a unit for storing monitoring results that are reported to the network manager and the network monitoring apparatus. The monitoring result storage unit 207 has a table 600 stored therein, which is illustrated in FIG. 6. The IP address duplication detection unit 205 writes the comparison result of the ID value to the table 600 of the monitoring result storage unit 207. The table 600 is made up of "IP address 601", "duplication detection count 602", "first detection time 603", and "final detection time 604". For example, if the IP address duplication detection unit 205 detects the duplication of an IP address in the same subnet, the IP address duplication detection unit 205 writes the duplicate IP address to the column of "IP address 601". If the same IP address has already been written in the column of "IP address 601", the IP address duplication detection unit 205 updates the corresponding "duplication detection count 602", and further updates the corresponding "final detection time 604".

The monitoring result output unit 208 obtains part or the whole of the table 600 stored in the monitoring result storage unit 207, and transmits the obtained data to the output unit 209. For example, the monitoring result output unit 208 summarizes the IP addresses that have been detected as being duplicated for each subnet. Furthermore, the monitoring result output unit 208 may perform filtering by using time, extracting statistical information, and transmitting the result to the output unit 209.

The output unit 209 is an interface for outputting a monitoring result. More specifically, the output unit 209 is a screen for displaying statistical information to the network manager. Furthermore, the output unit 209 may be a network interface that supports a communication protocol for performing transmission to the network management apparatus that manages the information processing apparatuses to notify the monitoring result of the network management apparatus.

3. Packet Stream

Figure 3:
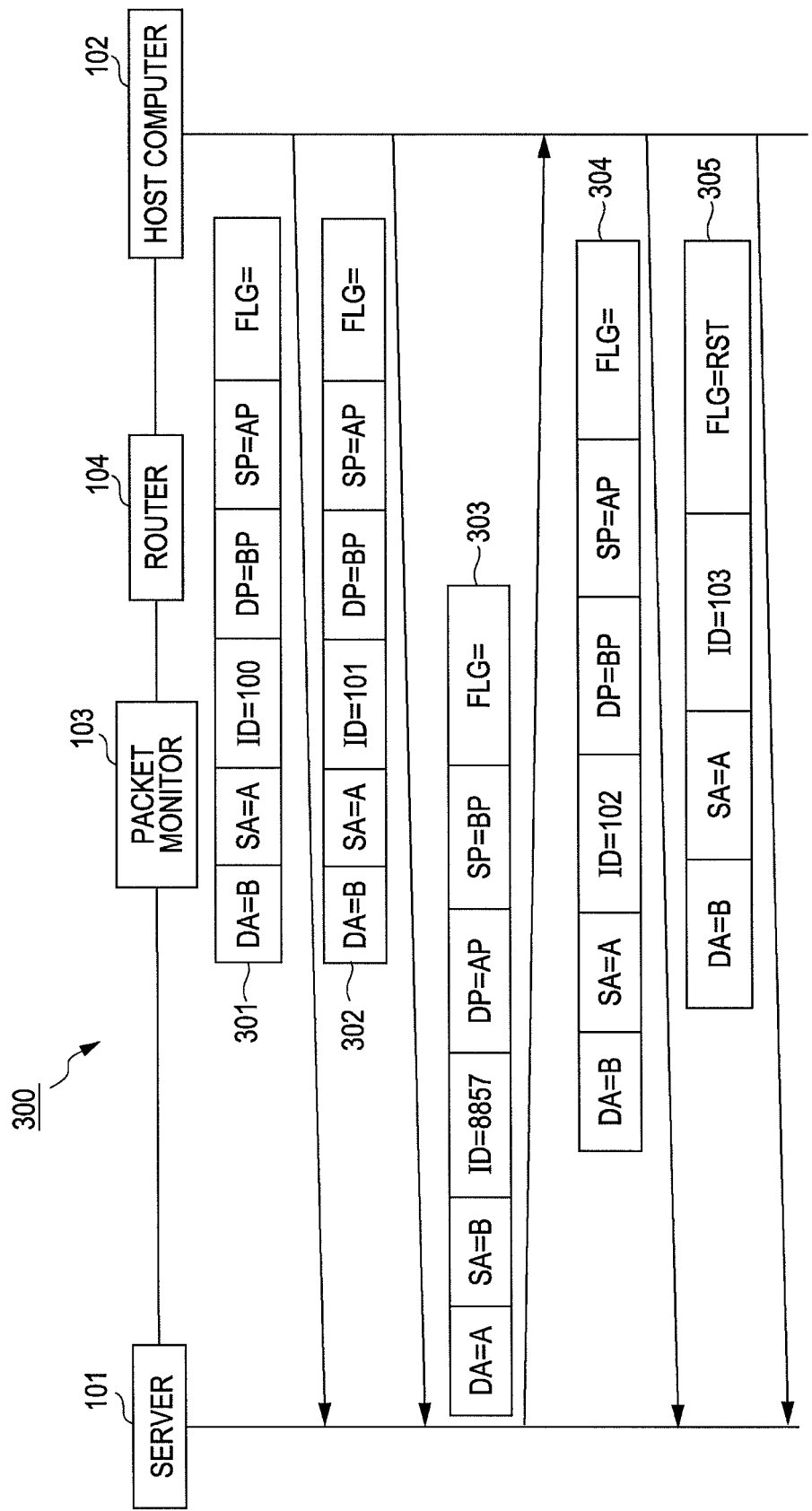
FIG. 3 illustrates a normal packet stream in the monitoring sequence 100 according to the present embodiment.

FIG. 3 illustrates a normal packet stream in the monitoring sequence 300 according to the present embodiment. A description will be given below, with reference to FIG. 3, of a packet stream in a case where another host computer having an IP address assigned to the host computer 102 does not exist in the subnet to which the host computer 102 belongs to. The monitoring sequence 300 is a sequence that indicates transmission and reception of packets between the server 101 and the host computer 102.

Similarly to the monitoring sequence 100 illustrated in FIG. 1, the packet monitor 103 monitors communication with the host computer 102 under the management of the server 101 and the router 104.

In the monitoring sequence 300, first, the host computer 102 transmits request packets 301 and 302 to the server 101 via the router 104. The ID value of the request packet 301 is "100". When viewed chronologically, after that, the ID value of the request packet transmitted by the host computer 302 is "101". The transmission destination address (DA) of the request packets 301 and 302 is the IP address "B" of the server 101. Furthermore, the transmission source address (SA) of the request packets 301 and 302 is the IP address "A" of the host computer 102. The transmission destination port (DA) of the request packets 301 and 302 is the port "BP" of the server 101. The transmission source port (SA) of the request packets 301 and 302 is the port "AP" of the host computer 102.

Then, the server 101 transmits a response packet 303 for the request packets 301 and 302 to the host computer 102. The ID value of the response packet 303 is "8857". Furthermore, the transmission destination address of the response packet 303 is the IP address "A" of the host computer 102. The transmission source address of the response packet 303 is the IP address "B" of the server. The transmission destination port of the response packet 303 is the port "AP" of the host computer 102. Furthermore, the transmission source port of the response packet 303 is the port "BP" of the server 101.

Next, the host computer 102 transmits the packet 304 to the server 101. The ID value of the packet 304 is "102". Furthermore, in the monitoring sequence 300, the host computer 102 transmits an RST packet 305 in which a reset flag (RST) is ON to the server 101 so as to notify the server 101 that the TCP connection is forcibly disconnected. When IP duplication occurs, in many cases, a packet containing a reset flag is received by the server 101. For this reason, only when the packet monitor 103 receives an RST packet for the server, the packet monitor 103 checks the ID (identification information) of the packet, making it possible to suppress occurrences of wrong information.

It can be determined based on the above that there is no duplication of an IP address in the same subnet when the ID value in the packet transmitted from the same IP address monotonically increases without being greatly increased and when an RST packet has been transmitted. That is, even when an RST packet has been transmitted, it can be supposed that the same host computer has transmitted an RST packet so as to forcibly disconnect the TCP connection.

Figure 4:
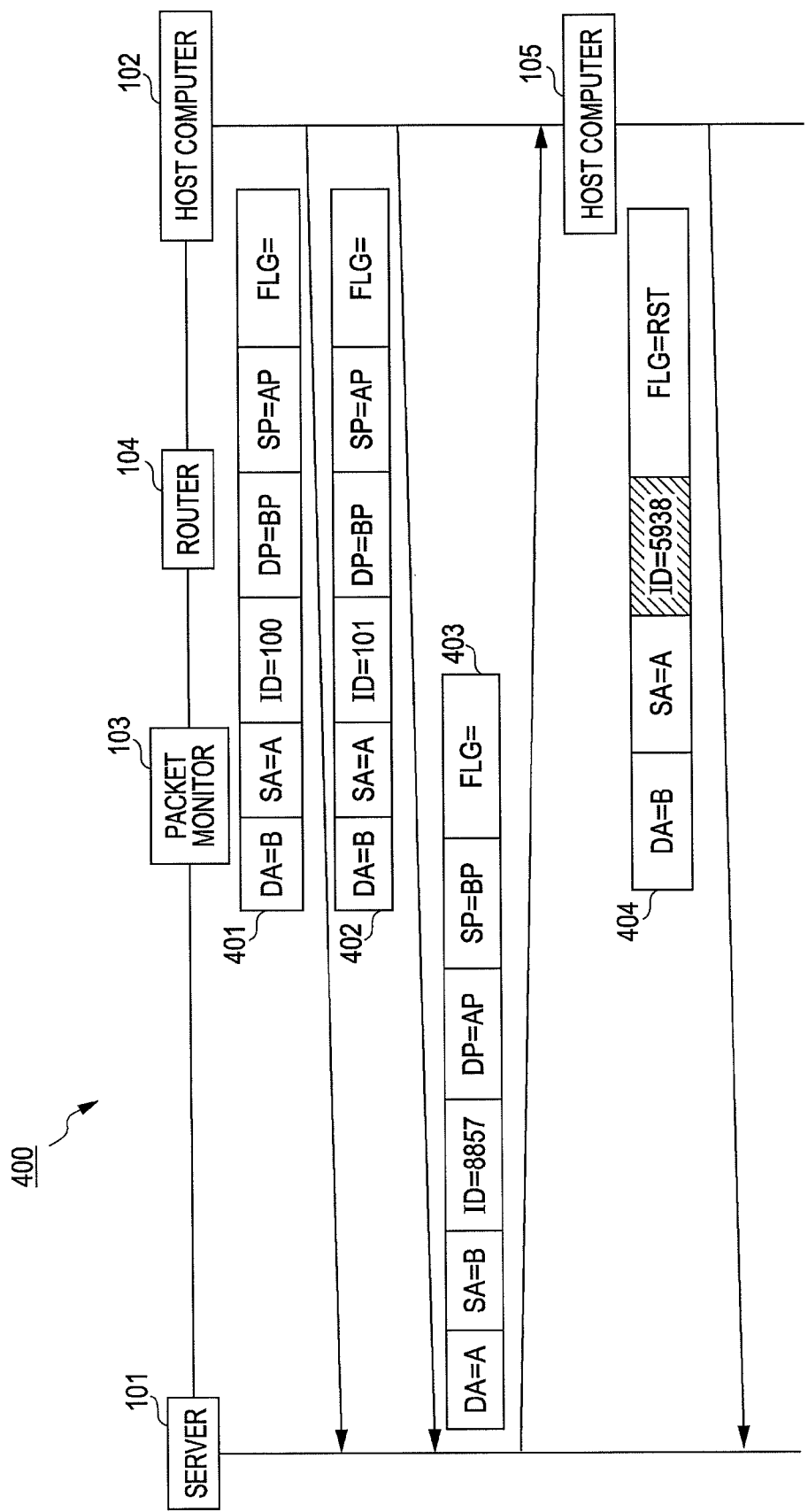
FIG. 4 illustrates a packet stream in duplication of IP addresses in the monitoring sequence 100 according to the present embodiment.

FIG. 4 illustrates a packet stream in the case of duplication of an IP address in the monitoring sequence 100 according to the present embodiment. A description will be given below, with reference to FIG. 4, of a packet stream in a case where another host computer 105 having an IP address assigned to the host computer 102 exists in the subnet to which the host computer 102 belongs. A monitoring sequence 400 is a sequence that indicates transmission and reception of packets between the server 101 and the host computer 102.

The monitoring system 400 is identical to the monitoring system 100 illustrated in FIG. 1, and information inside a packet is represented in more detail.

In the monitoring sequence 300, first, the host computer 102 transmits request packets 401 and 402 to the server 101 via the router 104. The ID value of the request packet 401 is "100". When viewed chronologically, after that, the ID value of the request packet transmitted by the host computer 302 is "101". The transmission destination address (DA) of the request packets 401 and 402 is the IP address "B" of the server 101. Furthermore, the transmission source address (SA) of the request packets 401 and 402 is the IP address "A" of the host computer 102. The transmission destination port (DA) of the request packets 401 and 402 is the port "BP" of the server 101. The transmission source port (SA) of the request packets 401 and 402 is the port "AP" of the host computer 102.

Then, the server 101 transmits a response packet 403 for the request packets 401 and 402. The ID value of the response packet 403 is "8857". Furthermore, the transmission destination address of the response packet 303 is the IP address "A" of the host computer 102. The transmission source address of the response packet 303 is the IP address "B" of the server. The transmission destination port of the response packet 303 is the port "AP" of the host computer 102. Furthermore, the transmission source port of the response packet 303 is the port "BP" of the server 101. In the monitoring sequence 400, the server 101 transmits the response packet 403 to the host computer 105 having the same IP address as that of the host computer 102.

The host computer 105 transmits an RST packet 404 to the server 101. The ID value of the RST packet 404 is "5938". The RST packet 404 is transmitted by the host computer 105 differing from the host computer 102. Since the host computer 105 suddenly receives the response packet 403 from the server 101, the host computer 105 transmits the RST packet 404 to the server 101 so that the TCP connection is forcibly disconnected.

It can be supposed based on the above that IP addresses are in duplicate in the same subnet when the ID value in the packet transmitted from the same IP address has greatly changed and when an RST packet has been transmitted. The case in which the ID value has greatly changed is a case in which the value has greatly changed between the ID values of the packets that have been continuously transmitted in a chronological manner from the host computer having the same IP address.

Figure 7:
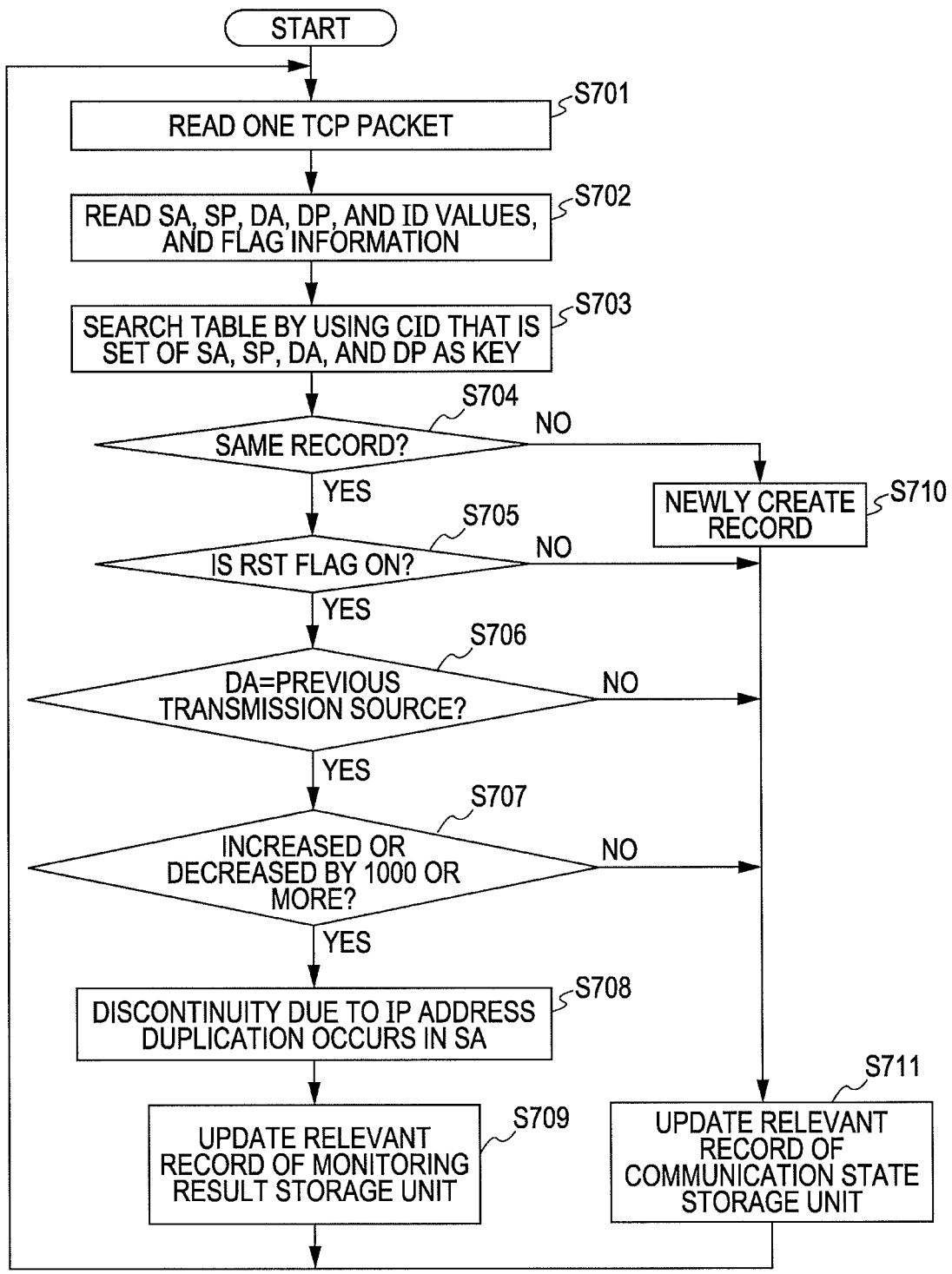
FIG. 7 is a flowchart for detecting duplication of IP addresses according to the present embodiment.

FIG. 7 is a flowchart for detecting duplication of an IP address according to the present embodiment. The packet monitor 103 reads one TCP packet by using the input unit 203 (S701). By using the packet information obtaining unit 204, the packet monitor 103 reads the SA, SP, DA, DP, and ID values, and flag information in the packet read in S701 (S702). The IP address duplication detection unit 205 searches the table 500 by using CID indicated by using a set of SA, SP, DA, and DP as a search condition (S703).

The IP address duplication detection unit 205 determines whether or not the same CID exists in the table 500. The "discrimination of the same CID" refers to determination of whether or not the same CID as the CID read by the packet information obtaining unit 204 in S702 exists in the table 500.

When the IP address duplication detection unit 205 determines that the same CID exists in the table 500 (YES in S704), the IP address duplication detection unit 205 determines whether or not the RST flag is ON by using the flag information read by the packet information obtaining unit 204 in S702 (S705).

When the IP address duplication detection unit 205 determines that the RST flag is ON (YES in S705), the IP address duplication detection unit 205 determines whether or not the DA is the transmission source address of the previous packet (S706). When the IP address duplication detection unit 205 determines that the DA is the transmission source of the previous packet (YES in S706), the IP address duplication detection unit 205 compares the ID value of the RST packet with the ID value of the packet, which has been determined to be the same CID in the table 500 of the communication state storage unit 206, and determines whether the ID value has increased or decreased by 1000 or more (S707).

When the IP address duplication detection unit 205 determines that the ID value of the RST packet has increased or decreased by 1000 or more in comparison with the ID value of the packet that has been determined to be the same CID in the table 500 (YES in S707), the IP address duplication detection unit 205 determines that the transmission source IP address of the RST packet has been assigned to a plurality of host computers which have different MAC addresses (transmission source IP addresses are duplicated) (S708). The ID value of the packet that has the same CID and that is transmitted by the same host computer is normally monotonically increased with the chronological order. For this reason, when the ID value of the packet after the comparison of the ID value is a value smaller than (has decreased) in S707, it is determined that the transmission source IP address of the RST packet has been assigned to a plurality of host computers. The IP address duplication detection unit 205 updates the table 600 in the monitoring result storage unit 207 (S709).

When the IP address duplication detection unit 205 determines in S704 that the same CID does not exist in the table 500 (NO in S704), the IP address duplication detection unit 205 creates a new record in the table 500 of the communication state storage unit 206 (S710). The record is a set of the CID 501, the previous reception time 502, the previous transmission source 503, the IA 504, the previous IA ID 505, the SA 506, and the previous SA ID 507. Since the packet is a packet in the new CID 501, the IP address duplication detection unit 205 stores the time at which the input unit 203 has received the packet this time as the previous reception time 502 in the table 500. Then, the IP address duplication detection unit 205 updates the table 500 of the communication state storage unit 206 (S711). The "updating of the table 500" referred to herein refers to that a created new record is stored in the table 500.

Furthermore, when the IP address duplication detection unit 205 determines in S705 that the flag information of the packet is OFF (NO in S705), the IP address duplication detection unit 205 updates the table 500 of the communication state storage unit 206 (S711). The "updating of the table" refers to updating of a record containing the CID that has been determined to be the same in S704.

Furthermore, when the IP address duplication detection unit 205 determines in S706 that the DA is not the transmission source of the previous packet (NO in S706), the IP address duplication detection unit 205 updates the table 500 of the communication state storage unit 206 (S711).

Furthermore, when the IP address duplication detection unit 205 determines in S707 that the ID value of the RST packet has neither increased nor decreased by 1000 or more in comparison with the ID value of the packet that has been determined to be the same CID in the table 500 (NO in S707), the IP address duplication detection unit 205 updates the table 500 of the communication state storage unit 206 (S711).

4. Example of Detection of duplication of IP Addresses using OS Type

Next, another embodiment of the packet monitor 103 will be described. The packet monitor 103 in the present embodiment determines the OS (Operating System) type and detects duplication of an IP address. The hardware configuration of the packet monitor 103 is realized by the configuration identical to that of the block diagram illustrated in FIG. 2.

The ID value is reset and starts from a random value in each TCP connection, depending on the OS type of the host computer that is the transmission source of the packet. Then, although the starting value of the ID value for each connection is not common in the same host computer, each time the host computer transmits one packet, the ID value increases by 1 if the transmitted packet belongs to the same TCP connection. For example, Linux (registered trademark) is a relevant OS.

Figure 8:
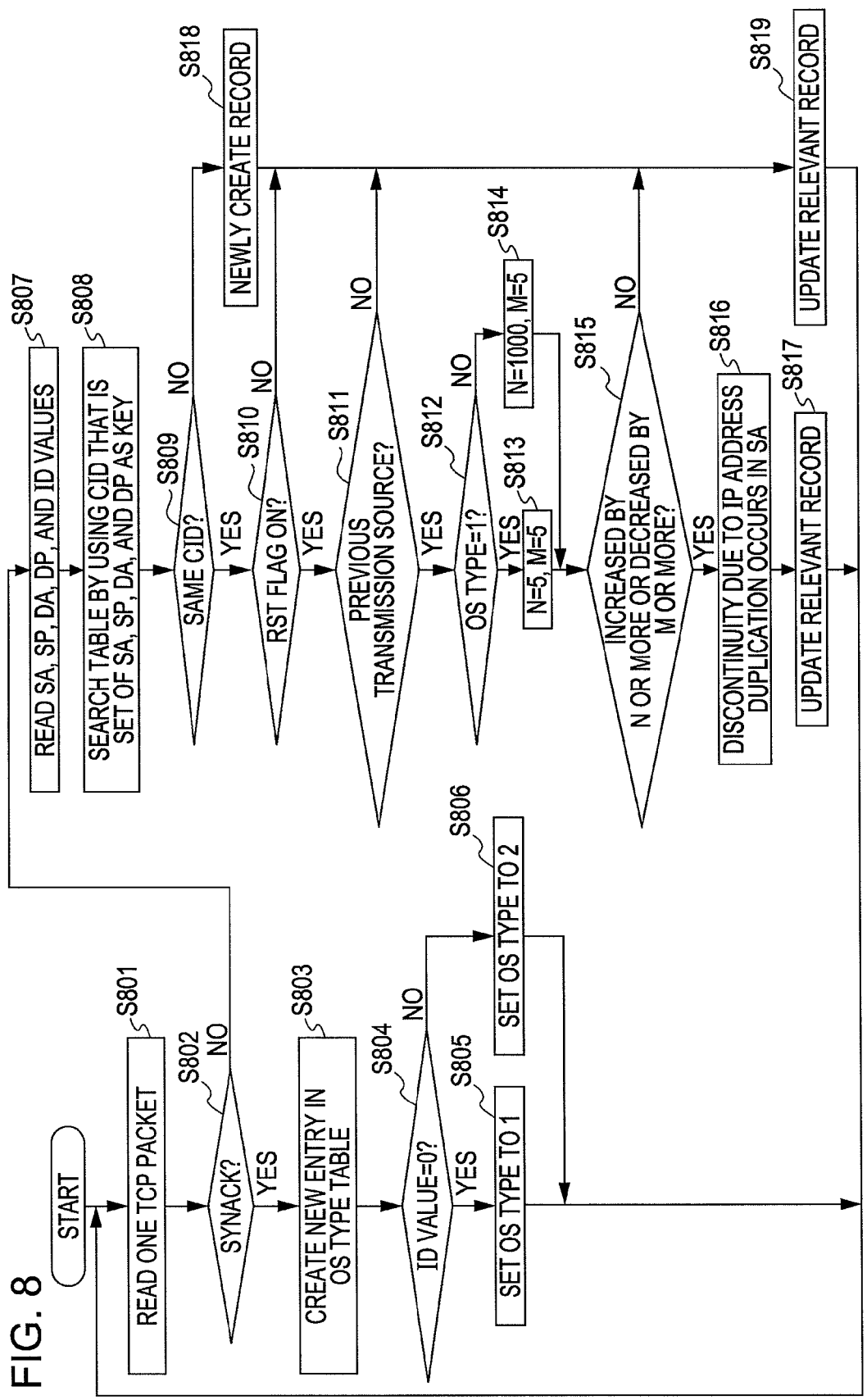
FIG. 8 is a flowchart for detecting duplication of IP addresses by using the type of OS according to the present embodiment.

FIG. 8 is a flowchart for detecting duplication of an IP address by using an OS type according to the present embodiment. The packet monitor 103 reads one TCP packet by using the input unit 203 (S801). The packet information obtaining unit 204 determines whether or not the packet that is read by using the input unit 203 is an SYNACK packet (S802). The SYNACK packet is an acknowledgement packet for the SYN packet (synchronization packet). The SYN packet is a packet for requesting permission of packet transfer among the computers. Therefore, when the packet information obtaining unit 204 detects an SYNACK packet, packet transfer is started between the computers that have transmitted and received the SYN packet and the SYNACK packet. For this purpose, the packet monitor 103 manages the OS type of the computer that performs the packet transfer.

When the packet information obtaining unit 204 determines that the read packet is an SYNACK packet (YES in S802), the packet information obtaining unit 204 creates a new entry and stores it in the OS type table 900 of the communication state storage unit 206 (S803). FIG. 9 illustrates an OS type table 900. The OS type table 900 is structured to include a transmission source address 901 and an OS type 901. The transmission source address 901 is the transmission source address of the SYNACK packet.

The packet information obtaining unit 204 determines whether or not the ID value of the read packet is "0" (S804). When the packet information obtaining unit 204 determines that the ID value of the read packet is "0" (YES in S804), the packet information obtaining unit 204 sets the OS type to "1" and stores it in the OS type table 900 (S805). For example, the OS relevant to the OS type "1" is Linux.

Furthermore, when the packet information obtaining unit 204 determines that the ID value of the read packet is not "0" (NO in S804), the packet information obtaining unit 204 sets the OS type to "2" and stores it in the OS type table 900 (S806). The OS relevant to the OS type "2" is the same as the OS of the embodiment illustrated in FIGS. 4 and 7.

In the present embodiment, the packet information obtaining unit 204 has stored a new entry in the OS type table 900 of the communication state storage unit 206. The packet information obtaining unit 204 is a unit that is functionally implemented in the processing unit 201. For this reason, in FIG. 2, the packet information obtaining unit 204 accesses the communication state storage unit 206 via the IP address duplication detection unit 205, or alternatively, may access it directly.

When the packet information obtaining unit 204 determines that the read packet is not an SYNACK packet (NO in S802), the packet information obtaining unit 204 reads the SA, SP, DA, DP, and ID values, and the flag information in the read packet (S807). The IP address duplication detection unit 205 searches the table 500 by using the CID represented by a set of SA, SP, DA, and DP as a search condition (S808).

The IP address duplication detection unit 205 determines whether or not the CID that is the same as the read CID exists in the table 500 (S809). When the IP address duplication detection unit 205 determines that the same CID exists in the table 500 (YES in S809), the IP address duplication detection unit 205 determines whether or not the RST flag is ON in the flag information read in S807 by the packet information obtaining unit 204 (S810). When the IP address duplication detection unit 205 determines that the RST flag is ON (YES in S810), the IP address duplication detection unit 205 determines whether or not the DA is the transmission source address of the previous packet (S811).

When the IP address duplication detection unit 205 determines that the DA is the transmission source of the previous packet (YES in S811), the IP address duplication detection unit 205 determines whether or not the OS type of the host computer that transmitted the packet is "1" (S812). When the IP address duplication detection unit 205 determines that the OS type is "1" (YES in S812), the IP address duplication detection unit 205 sets that N="5" and M="5" (S813). Then, the IP address duplication detection unit 205 determines whether or not the ID value of the RST packet has increased by N or more or has decreased by M or more in comparison with the ID value of the packet that has been determined to be the same CID in the table 500 of the communication state storage unit 206 (S815). Here, as the IP address duplication detection unit 205 has set in S813, N="5" and M="5".

When the IP address duplication detection unit 205 determines that the ID value of the RST packet has increased by 5 or more or has decreased 5 or more when compared to the ID value of the packet that has been determined to be the same CID in the table 500 of the communication state storage unit 206 (YES in S815), the IP address duplication detection unit 205 determines that the transmission source IP address of the RST packet has been assigned to a plurality of host computers (transmission source IP addresses are duplicated) (S816). The IP address duplication detection unit 205 updates the table 600 in the monitoring result storage unit 207 (S817).

Furthermore, when the IP address duplication detection unit 205 determines that the OS type is not "1" (NO in S812), the IP address duplication detection unit 205 sets that N="1000" and M="5". Then, the IP address duplication detection unit 205 determines whether or not the ID value of the RST packet has increased by N or more or has decreased by M or more in comparison with the ID value of the packet that has been determined to be the same CID in the table 500 of the communication state storage unit 206 (S815). Here, as the IP address duplication detection unit 205 has set in S814, N="1000" and M="5".

When the IP address duplication detection unit 205 determines that the ID value of the RST packet has increased by 1000 or more or has decreased by 5 or more when compared to the ID value of the packet that has been determined to be the same CID in the table 500 of the communication state storage unit 206 (YES in S815), the IP address duplication detection unit 205 determines that the transmission source IP address of the RST packet has been assigned to a plurality of host computers which have different MAC addresses (transmission source IP addresses are duplicated) (S816). The IP address duplication detection unit 205 updates the table 600 of the monitoring result storage unit 207 (S817).

When the IP address duplication detection unit 205 determines in S809 that the same CID does not exist in the table 500 (NO in S809), the IP address duplication detection unit 205 creates a new record in the table 500 of the communication state storage unit 206 (S818). The record is a set of the CID 501, the previous reception time 502, the previous transmission source 503, the IA 504, the previous IA ID 505, the SA 506, and the SA previous ID 507. Since the packet is a packet in the new CID 501, the IP address duplication detection unit 205 sets the time at which the packet has been received by the input unit 203 this time as previous reception time 502, and stores it in the table 500. Then, the IP address duplication detection unit 205 updates the table 500 of the communication state storage unit 206 (S711). The "updating of the table 500" referred to herein refers to the storage of the created new record in the table 500.

Furthermore, when the IP address duplication detection unit 205 determines in S810 that the flag information of the packet is OFF (NO in S810), the IP address duplication detection unit 205 updates the table 500 of the communication state storage unit 206 (S819). The "updating of the table" referred to herein refers to the updating of a record containing the CID that has been determined to be the same in S809.

Furthermore, when the IP address duplication detection unit 205 determines in S811 that the DA is not the transmission source of the previous packet (NO in S811), the IP address duplication detection unit 205 updates the table 500 of the communication state storage unit 206 (S819).

Furthermore, when the IP address duplication detection unit 205 determines in S815 that the ID value of the RST packet has not increased by N or more or has decreased by M or more when compared to the ID value of the packet that has been determined to be the same CID in the table 500 (NO in S815), the IP address duplication detection unit 205 updates the table 500 of the communication state storage unit 206 (S819). Here, when the process undergoes the step of S813, N="5" and M="5". When the process undergoes the step of S814, N="1000" and M="5".

5. Exception Process, Such as Case in which Restart Process is Performed

Figure 10:
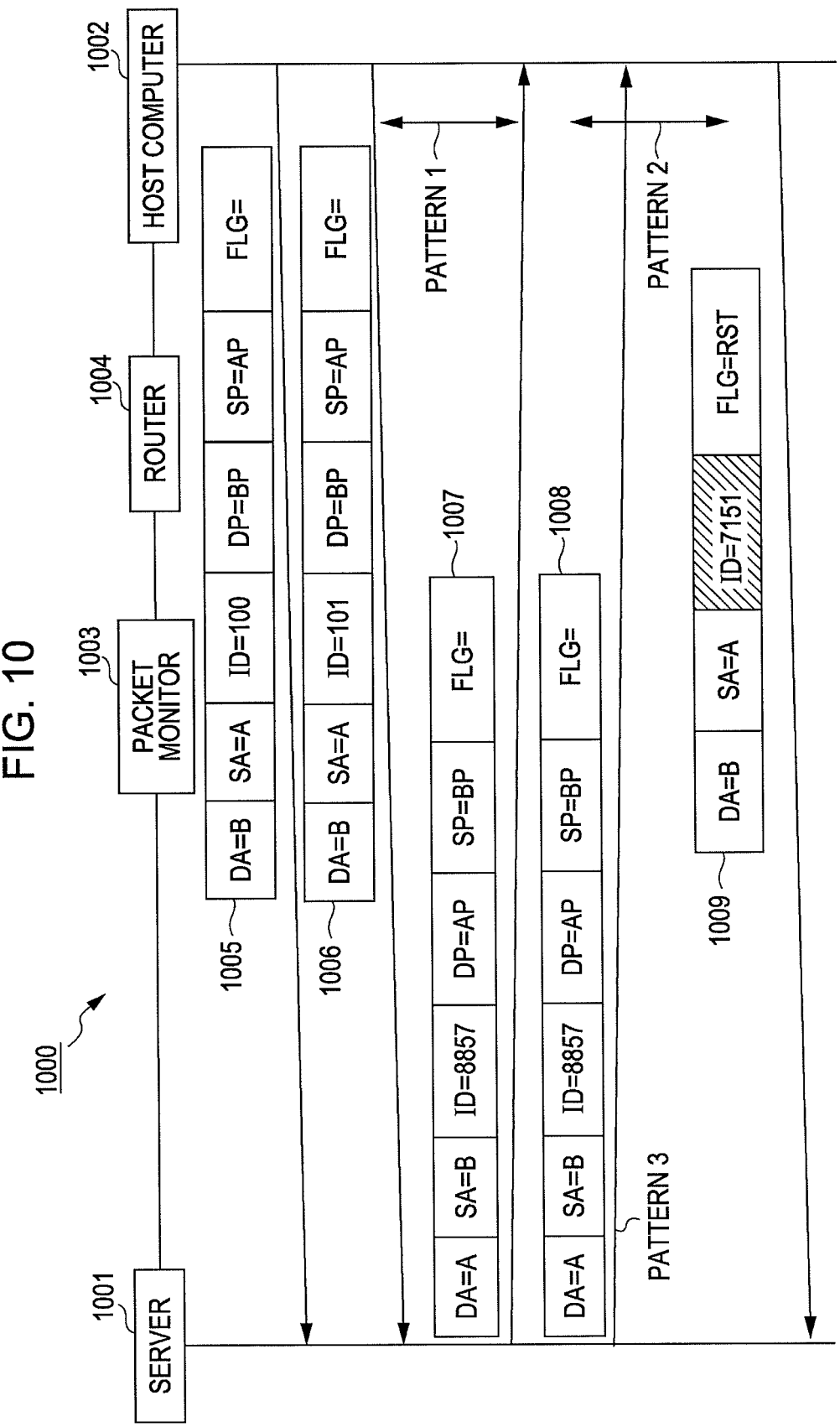
FIG. 10 illustrates a packet stream in a monitoring sequence 1000 according to the present embodiment.

FIG. 10 illustrates a packet stream in a monitoring sequence 1000 in a case where a host computer 1002 performs a restart process. In the same subnet, even when the same IP address has not been assigned to a plurality of host computers, there is a case in which the ID value of the RST packet has greatly increased than the ID value of the packet that has been transmitted immediately before chronologically in the same TCP connection.

An example thereof is a case in which a packet 1007 is received from the server 1001 after a long period of time has passed from when the host computer 1002 transmitted the packet 1006 to the server 1001 (pattern 1). In this case, there is a case in which the host computer 1002 may have transmitted a packet to a computer other than the server 1001 from when the packet 1006 is transmitted until the RST packet 1009 is transmitted. In such a case, the ID value of the RST packet 1009 greatly differs from the ID value of the packet 1006 that has been transmitted immediately before in the same TCP connection.

Similarly, when the host computer 1002 transmits the packet 1009 after a long period of time has passed from when the packet 1007 was received, there is a case in which the ID value of the RST packet 1009 greatly increases when compared to the ID value of the packet 1006 that has been transmitted immediately before chronologically in the same TCP connection (pattern 2). Also, this case results from that the host computer 1002 has transmitted a packet to a computer other than the server 1001 from when the packet 1006 was transmitted until the RST packet 1009 was transmitted.

Furthermore, when the host computer 1002 is restarted while communicating with the server 1001, there is a case in which the host computer 1002 responds with an RST packet. The reason for this is that, after restarting, the host computer 1002 receives a packet 1008 in an unknown TCP connection. In this case, since the host computer 1002 is in a state of having been restarted, there is a case in which the ID value of the RST packet 1009 greatly differs from the ID value of the packet 1006 before restarting (pattern 3).

In the packet stream illustrated in FIG. 10, the ID value of the RST packet 1009 is "7151". The ID value "7151" of the packet 1009 greatly differs (markedly increased) from the ID value "101" of the packet 1006 that was sent by the host computer 1002 to the server 1001 before the RST packet 1009. In the present embodiment, in order to more reliably detect duplication of an IP address, the above case is excluded from the detection target by considering the case as an exception.

Figure 11:
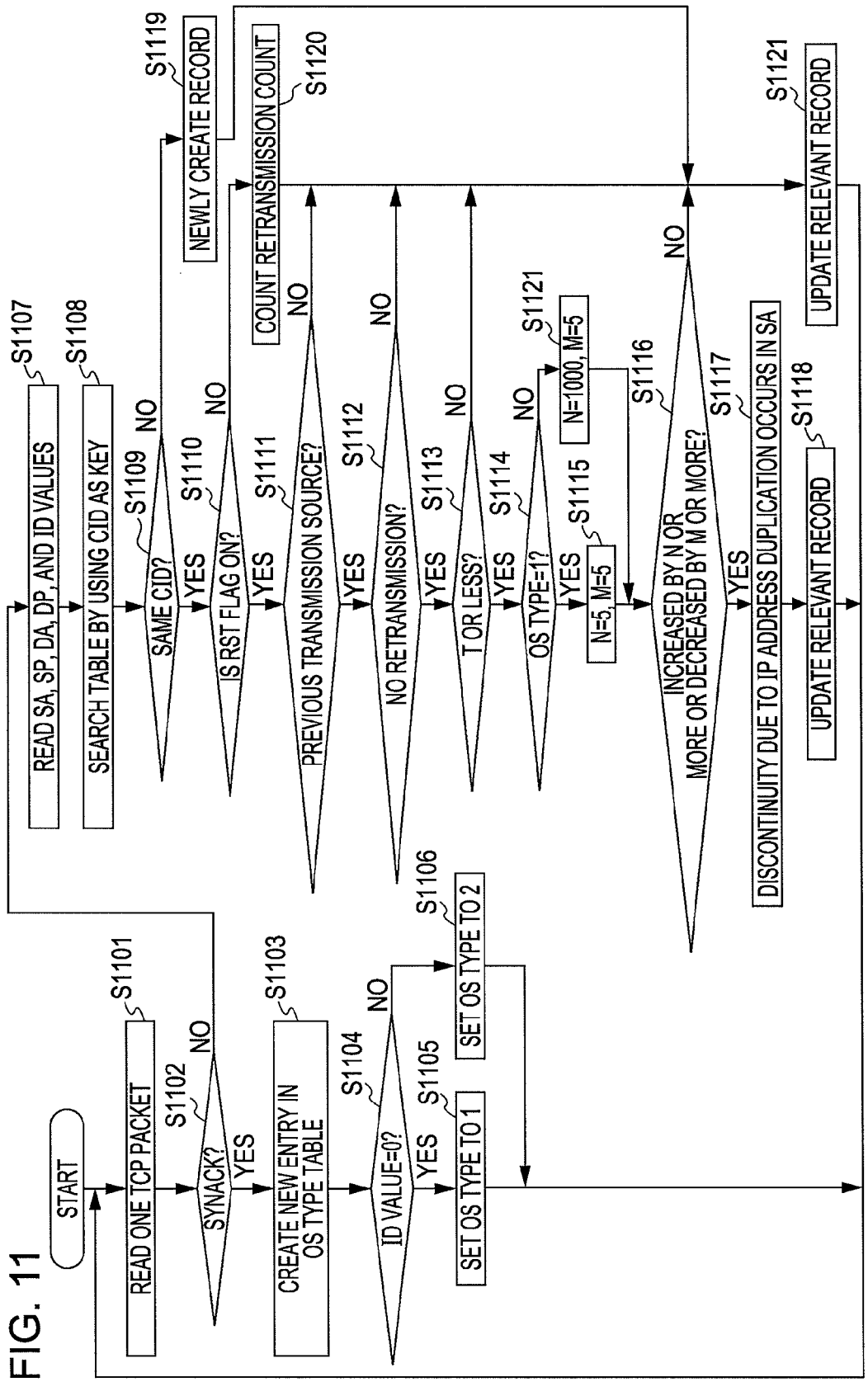
FIG. 11 is a flowchart for detecting duplication of IP addresses according to the present embodiment.

FIG. 11 is a flowchart for detecting duplication of IP addresses according to the present embodiment.

In the present embodiment, also, a determination is made as to the OS type, and duplication of an IP address in the same subnet is detected.

The packet monitor 103 reads one TCP packet by using the input unit 203 (S1101). The packet information obtaining unit 204 determines whether or not the read packet is an SYNACK packet (S1102).

When the packet information obtaining unit 204 determines that the read packet is an SYNACK packet (YES in S1102), the packet information obtaining unit 204 creates a new entry and stores it in the OS type table 900 of the communication state storage unit 206 (S1103). The packet information obtaining unit 204 determines whether or not the ID value of the read packet is "0" (S1104). When the packet information obtaining unit 204 determines that the ID value of the read packet is "0" (YES in S1104), the packet information obtaining unit 204 sets the OS type to "1" and stores it in the OS type table 900 (S1105).

When the packet information obtaining unit 204 determines that the ID value of the read packet is not "0" (NO in S1104), the packet information obtaining unit 204 sets the OS type to "2" and stores it in the OS type table 900 (S1106). In the present embodiment, the packet information obtaining unit 204 has stored a new entry in the OS type table 900 of the communication state storage unit 206. The packet information obtaining unit 204 is a unit that is functionally implemented in the processing unit 201. For this reason, in FIG. 2, the packet information obtaining unit 204 accesses the communication state storage unit 206 via the IP address duplication detection unit 205, or alternatively, may access it directly.

When the packet information obtaining unit 204 determines that the read packet is not an SYNACK packet (NO in S1102), the SA, SP, DA, DP, and ID values, and the flag information in the read packet are read (S1107). The IP address duplication detection unit 205 searches a table 1200 by using a CID represented by a set of SA, SP, DA, and DP as a search condition (S1108).

FIG. 12 illustrates the table 1200 in the communication state storage unit 206 according to the present embodiment. By using the table 1200, the packet monitor 103 manages the retransmission count of the packet. The table 1200 is structured to include a CID 1201, a previous transmission source 1202, an IA 1203, an previous IA ID 1204, a retransmission count 1205 immediately before IA, an previous IA reception time 1206, and an SA 1207, an previous SA ID 1208, a retransmission count 1209 immediately before SA, and a previous reception time 1210.

The IA 1203 represents an IP address possessed by the apparatus on the side that transmitted an SYN packet. The previous IA ID 1204 is an ID value of the packet that was sent immediately before by the apparatus on the side that transmitted the SYN packet. The retransmission count 1205 immediately before IA represents the count in which the apparatus on the side that transmitted the SYN packet retransmitted the packet immediately before. The IA previous reception time 1206 is time at which the packet is received immediately before from the device on the side that transmitted the SYN packet. The SA 1207 represents the transmission source address of the response packet. The previous SA ID 1208 represents the ID value of the immediately previous response packet. The retransmission count 1209 immediately before SA represents the count at which the device having the transmission source address of the response packet retransmitted the response packet immediately before. The previous reception time 1210 represents the time at which the response packet is received from the device having the transmission source address of the response packet immediately before. The entity that receives the response packet is the IP address duplication detection unit 205.

The IP address duplication detection unit 205 determines whether or not the same CID as the read CID exists in the table 1200 (S1109). When the IP address duplication detection unit 205 determines that the same CID exists in the table 1200 (YES in S1109), the IP address duplication detection unit 205 determines whether or not the RST flag is ON in the flag information read by the packet information obtaining unit 204 in S1107 (S1110). When the IP address duplication detection unit 205 determines that the RST flag is ON (YES in S1110), the IP address duplication detection unit 205 determines whether or not the DA is the transmission source address of the previous packet.

When the IP address duplication detection unit 205 determines that the DA is the transmission source address of the previous packet (YES in S1111), the IP address duplication detection unit 205 determines whether or not the response packet has been retransmitted from the server 1001 having the destination address of the RST packet immediately before the RST packet was received (S1112). In other words, the IP address duplication detection unit 205 determines whether or not the same response packet has been received a plurality of times from the server 1002 immediately before the RST packet in the same TCP connection. More specifically, the IP address duplication detection unit 205 determines whether or not the response packet has been retransmitted by referring to the retransmission count 1209 immediately before the SA of the table 1200.

When the IP address duplication detection unit 205 determines that the server 1001 has not retransmitted the response packet (YES in S1112), the IP address duplication detection unit 205 determines whether or not the difference between time T1 at which the RST packet was received and time T2 at which the server 1001 transmitted the response packet in the same TCP connection immediately before the RST packet was received and the response packet is received by the IP address duplication detection unit 205 was smaller than or equal to a certain time period (S1113). For example, T is a value, such as one minute. When the host computer 1002 transmits the RST packet after one minute has passed, the packet monitor 103 determines that there is no duplication of an IP address even if the ID value of the RST packet is any value, thereby making it possible to exclude the exceptional communication sequence.

More specifically, the IP address duplication detection unit 205 searches the table 1200 of the communication state storage unit 206. The IP address duplication detection unit 205 makes comparison by referring to time T1 at which the RST packet is received and the previous reception time 1210 of the table 1200. The previous reception time 1210 that is compared with the time T1 at which the RST packet is received is time T2 at which a response packet is received in the same TCP connection immediately before the RST packet is received from the server 1001.

Similarly, for simplicity of description, it is simply determined that the previous ID and the ID have been transmitted from different hosts at the same address when the value has increased or decreased by 1000 or more. However, in practice, consideration needs to be given to cases in which the ID is a value that circles every 16 bits, and an IP packet does not arrive in the order of transmission and the order is inverted. For this reason, a comparison may be made by considering the circling of a 16-bit value, and also, determination may be performed on the basis of the fact that the value has not simply decreased, but has decreased by 10 or more.

Furthermore, the ID is a 16-bit value. Depending on the implementation of the host, there is a possibility that endians, which are highest or lowest ranked bits out of 8 bits, are not in the network order but in the host order. In that case, continuity in which the higher order/lower order is reversed may be compared.

According to the monitoring apparatus in the present embodiment, by monitoring an ID value of a packet, it is possible to detect duplication of IP addresses in a subnet.

Regarding the foregoing, the higher order concept can be expressed as follows. The packet monitor 103 is a monitoring apparatus that monitors communication of packets having identification information, which increases each time the packet is transmitted, among information processing apparatuses. The monitoring apparatus includes a storage unit configured to store the identification information of a first packet transmitted from the information processing apparatus and the transmission source address of the first packet in such a manner as to be associated with each other, and an input unit for receiving a second packet that is newly transmitted from the information processing apparatus. Furthermore, the monitoring apparatus includes a processing unit configured to, when the transmission source address of the first packet matches the transmission source address of the second packet, determine that the IP address assigned to the information processing apparatus has been assigned to the other information processing apparatuses when the identification information of the first packet is compared with the identification information of the second packet and is determined to be discontinuous.

Furthermore, when the identification information of the first packet is compared with the identification information of the second packet and is determined to be discontinuous, the monitoring apparatus determines that the same address has been assigned to a plurality of information processing apparatuses in the same subnet.

Furthermore, the storage unit of the monitoring apparatus stores the destination address of the first packet in such a manner as to be associated with the transmission source address of the first packet. When the transmission source address and the destination address of the first packet match the transmission source address and the destination address of the second packet, respectively, the processing unit performs comparison and determination of the identification information.

When the second packet contains a reset flag, the processing unit of the monitoring apparatus compares the identification information of the first packet with the identification information of the second packet so as to detect duplication of an IP address with higher accuracy.

Furthermore, each time the OS of the information processing apparatus starts communication with the server, the processing unit of the monitoring apparatus determines whether or not the OS is an OS that resets the identification information of the second packet.

The storage unit of the monitoring apparatus further stores first packet transmission time that indicates time at which the information processing apparatus transmitted the first packet. The processing unit compares the transmission time of the second packet with the first packet transmission time, and when the elapsed time is smaller than or equal to a predetermined time period, the processing unit compares the identification information of the first packet with the identification information of the second packet.

Furthermore, the monitoring apparatus includes an output unit configured to notify a network management apparatus that manages the information processing apparatuses of a determination result in the processing unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A monitoring apparatus for monitoring packet communication, the monitoring apparatus comprising:
    a first interface configured to receive packets transmitted from a plurality of information processing apparatuses;
    a storage configured to store a first identification value of a first packet and a first transmission source address of the first packet; and
    a processor configured to:
    retrieve the first identification value stored in the storage corresponding to the first transmission source address that matches a second transmission source address of a second packet;
    compare a second identification value of the second packet with the retrieved first identification value, and
    detect a duplication of an IP address by identifying a difference between the first identification value and the second identification value that exceeds a predetermined value.

2. The monitoring apparatus according to claim 1, wherein the processor compares the second identification value with the first identification value upon detecting a reset flag in the second packet.

3. The monitoring apparatus according to claim 1, wherein the first and second identification values monotonically increase each time the first and second packets are transmitted, respectively.

4. The monitoring apparatus according to claim 3, wherein the processor detects the duplication of the IP address by identifying a discontinuity between the second identification value and the first identification value.

5. The monitoring apparatus according to claim 3, wherein the processor detects the duplication of the IP address by identifying the second identification value as being less than the first identification value, the second packet being transmitted subsequently to the first packet.

6. The monitoring apparatus according to claim 1, wherein the processor determines that a first IP address of a first information processing apparatus that transmits the first packet is assigned in duplicate to a second information processing apparatus by identifying the difference that exceeds the predetermined value, the first and second information apparatuses having different MAC addresses.

7. The monitoring apparatus according to claim 1,
    wherein the storage further stores a first transmission destination address,
    wherein the processor compares the second identification value with the first identification value that is retrieved from the storage by matching the second transmission source address and a second transmission destination address of the second packet with the first transmission source address and the first transmission destination address of the first packet, respectively.

8. The monitoring apparatus according to claim 1,
    wherein the processor determines whether an OS of an information processing apparatus that transmits the second packet resets the second identification value each time the information processing apparatus starts packet communication,
    wherein the processor sets a different value as the predetermined value on the basis of a result of the determining.

9. The monitoring apparatus according to claim 1,
    wherein the storage further stores a first transmission time that indicates a transmission time of the first packet,
    wherein the processor compares the second identification value with the first identification value upon detecting a time difference between the first transmission time and a second transmission time as being less than a predetermined time, the second transmission time being a transmission time of the second packet.

10. The monitoring apparatus according to claim 1, further comprising:
    a second interface configured to notify a result of the detecting of a network management apparatus that manages the information processing apparatuses.

11. A method for monitoring packet communications, the method comprising:
    receiving packets transmitted from a plurality of information processing apparatuses;
    storing a first identification value of a first packet and a first transmission source address of the first packet;
    comparing, by a monitoring apparatus, a second identification value of a second packet with the first identification value of the first packet when a second transmission source address of the second packet matches the first transmission source address of the first packet; and
    detecting, by the monitoring apparatus, duplication of an IP address when a difference between the first identification value and the second identification value exceeds a predetermined value on the basis of a result of the comparing.

12. The method according to claim 11, wherein the comparing compares the second identification value with the first identification value when the second packet contains a reset flag.

13. The method according to claim 11, wherein the first and second identification values monotonically increase each time the first and second packets are transmitted, respectively.

14. The method according to claim 13, wherein the detecting detects the duplication of the IP address when the second identification value is discontinuous with the first identification value.

15. The method according to claim 13, wherein the detecting detects the duplication of the IP address when the second identification value is less than the first identification value, the second packet being transmitted subsequently to the first packet.

16. The method according to claim 11, wherein the determining determines that a first IP address of a first information processing apparatus that transmits the first packet is assigned in duplicate to a second information processing apparatus when the difference exceeds the predetermined value, the first and second information apparatuses having different MAC addresses.

17. The method according to claim 11, further comprising:
storing a first transmission destination address,
wherein the comparing compares the second identification value with the first identification value when the second transmission source address and a second transmission destination address of the second packet match the first transmission source address and the first transmission destination address of the first packet, respectively.

18. The method according to claim 11,
wherein the determining determines whether an operating system of an information processing apparatus that transmits the second packet resets the second identification value each time the information processing apparatus starts packet communication,
wherein the method further comprises:
setting a different value as the predetermined value on the basis of a result of the determining.

19. The method according to claim 11, further comprising:
storing a first transmission time that indicates a transmission time of the first packet,
wherein the comparing compares the second identification value with the first identification value when a time difference between the first transmission time and a second transmission time is less than a predetermined time, the second transmission time being a transmission time of the second packet.

20. The method according to claim 11, further comprising:
notifying a result of the detecting of a network management apparatus that manages the information processing apparatuses.

* * * * *